(12) United States Patent
Yang et al.

(10) Patent No.: US 12,738,827 B1
(45) Date of Patent: Sep. 15, 2026

(54) TELESCOPIC MOTOR WITH TELESCOPIC ROTOR ASSEMBLY

(71) Applicant: Dongguan Jindouyun Silicone Electronics Co., Ltd., Dongguan (CN)

(72) Inventors: Jiaze Yang, Dongguan (CN); XueFei Cai, Dongguan (CN); Wenbin Guan, Dongguan (CN)

( * ) Notice: Subject to any disclaimer, the term of this patent is extended or adjusted under 35 U.S.C. 154(b) by 0 days.

(21) Appl. No.: 19/416,554

(22) Filed: Dec. 11, 2025

(51) Int. Cl.
*H02K 41/02* (2006.01)

(52) U.S. Cl.
CPC .................................... *H02K 41/02* (2013.01)

(58) Field of Classification Search
CPC ........ H02K 33/12; H02K 33/14; H02K 33/16; H02K 35/02; H02K 41/02; H02K 41/03; H02K 41/031
See application file for complete search history.

(56) References Cited

U.S. PATENT DOCUMENTS

| | | | | |
|---|---|---|---|---|
| 12,121,488 | B1 * | 10/2024 | Cai | H02K 1/185 |
| 2008/0284268 | A1 * | 11/2008 | Yuratich | H02K 5/1285 310/156.09 |
| 2018/0301970 | A1 * | 10/2018 | Hartramph | H02K 41/031 |
| 2025/0062669 | A1 * | 2/2025 | Takahashi | H02K 11/215 |

FOREIGN PATENT DOCUMENTS

| | | | | |
|---|---|---|---|---|
| CN | 114123704 A * | 3/2022 | | H02K 33/18 |
| CN | 118353195 A * | 7/2024 | | H02P 27/04 |
| GB | 2214724 A * | 9/1989 | | H02K 33/18 |
| WO | WO-2024012266 A1 * | 1/2024 | | H02K 41/00 |

OTHER PUBLICATIONS

Guan, Machine Translation of CN114123704, Mar. 2022 (Year: 2022).*
Zhou, Machine Translation of CN118353195, Jul. 2024 (Year: 2024).*
Deng, Machine Translation of WO2024012266, Jan. 2024 (Year: 2024).*

* cited by examiner

*Primary Examiner* — Eric Johnson
(74) *Attorney, Agent, or Firm* — Daniel M. Cohn; Howard M. Cohn

(57) ABSTRACT

A telescopic motor is provided, including a housing assembly, a stator assembly, at least one guide member, and a telescopic rotor assembly. The stator assembly includes a core structure, the core structure is limitably fixed in the housing assembly, the core structure includes core bodies and a coil bobbin structure, the core bodies are circumferentially connected in sequence, the coil bobbin structure passes through the core structure, and a coil is externally wound on the coil bobbin structure. The at least one guide member is fixed on the core structure. The telescopic rotor assembly is slidably disposed on the at least one guide member and movably penetrates through the stator assembly and the housing assembly in sequence. The stator assembly drives the telescopic rotor assembly to linearly reciprocate under a guiding action of the at least one guide member.

17 Claims, 4 Drawing Sheets

TELESCOPIC MOTOR WITH TELESCOPIC ROTOR ASSEMBLY

TECHNICAL FIELD

The present disclosure relates to a technical field of motors, and in particular to a telescopic motor.

BACKGROUND

Telescopic motors are widely used as transmission components in various types of mechanical equipment, electronic devices, toys, household products, adult products, and door locks. As a key component in automatic transmission systems, the telescopic motors play a critical functional role.

Chinese Patent Publication No. CN205622351U discloses a telescopic motor, including a housing, a front end cover, a rear end cover, a stator, and a rotor. The stator is disposed on the housing, and the rotor is disposed in the stator. The front end cover and the rear end cover are respectively disposed at a front end and a rear end of the housing, and both ends of the rotor extend through the front end cover and the rear end cover. Stator teeth are circumferentially disposed on an inner side of the stator. Elastic blocks and winding slots are respectively disposed on the stator teeth, and springs and windings are accommodated in the winding slots.

Although the above structure enables the telescopic motor to achieve telescopic functionality, it suffers from drawbacks, such as a complicated configuration, a cumbersome manufacturing process, difficulties in quality control, and low production efficiency. Accordingly, there remains a need for an improved telescopic motor capable of overcoming these deficiencies.

SUMMARY

The present disclosure aims to provide a telescopic motor to address problems of complex structures and low production efficiency of conventional telescopic motors.

To achieve above aims, the present disclosure provides following technical solutions.

The present disclosure provides the telescopic motor, including a housing assembly, a stator assembly, at least one guide member, and a telescopic rotor assembly. The stator assembly includes a core structure, the core structure is limitably fixed in the housing assembly, the core structure includes core bodies and a coil bobbin structure, the core bodies are circumferentially connected in sequence, the coil bobbin structure passes through the core structure, and a coil is externally wound on the coil bobbin structure. The at least one guide member is fixed on the core structure. The telescopic rotor assembly is slidably disposed on the at least one guide member and movably penetrates through the stator assembly and the housing assembly in sequence. The stator assembly drives the telescopic rotor assembly to linearly reciprocate under a guiding action of the at least one guide member.

In one embodiment, the core bodies include a first core body and a second core body, the first core body is detachably engaged with the second core body, and the first core body is limitably fixed in the housing assembly.

In one embodiment, at least one first limiting groove is defined on an inner wall of the housing assembly. At least one limiting block is disposed on an outer side of the first core body. The at least one first limiting block is limitably engaged with the at least one first limiting groove.

In one embodiment, at least one engagement groove is defined on an inner side of the first core body. At least one engagement protrusion is disposed on the second core body. The at least one engagement protrusion is detachably engaged with the at least one engagement groove.

In one embodiment, at least one second limiting groove is defined on the inner side of the first core body. The at least one guide member is limitably fixed to the core structure through the at least one second limiting groove.

In one embodiment, the at least one guide member includes two guide members, and the at least one second limiting groove include two second limiting grooves. The two guide members are symmetrically limitably fixed to the core structure through the two second limiting grooves.

In one embodiment, at least one oil filling hole is defined on the at least one guide member and penetrates through the at least one guide member, and lubricating oil is filled onto a guiding surface of the at least one guide member via the at least one oil filling hole.

In one embodiment, the telescopic rotor assembly includes a rotor mechanism and a telescopic frame. The rotor mechanism movably passes through the stator assembly. The telescopic frame is slidably disposed on the at least one guide member and drivably connected to the rotor mechanism.

In one embodiment, the rotor mechanism includes a magnetic steel and a rotating shaft. The magnetic steel is a cylindrical magnet. The rotating shaft passes through the magnetic steel and is drivably connected to the telescopic frame.

In one embodiment, the magnetic steel is made of a neodymium-iron-boron (NdFeB) magnet.

In one embodiment, the telescopic frame defines two connecting holes, the two connecting holes are opposite to each other, and two ends of the rotating shaft are respectively fixed in the two connecting holes.

In one embodiment, the at least one guide member includes two guide members, two guiding edges are respectively disposed at two opposite sides of the telescopic frame, and the two guiding edges are respectively slidably disposed on the two guide members.

In one embodiment, the two guiding edges are two guiding strips, each of the two guide members includes a guiding groove, and each of the two guiding strips is slidably disposed in a corresponding guiding groove.

In one embodiment, the two guiding edges are two guiding grooves, each of the two guide members includes a guiding strip, and each of the two guiding grooves is slidably disposed on a corresponding guiding strip.

In one embodiment, the at least one guide member and the telescopic frame are made of polyoxymethylene (POM).

In one embodiment, the housing assembly includes a first housing, a second housing, and a shaft sleeve. The first housing is hollow and defines an opening at one end thereof, and the stator assembly is limitably fixed in the first housing. The second housing is fixedly disposed in the first housing, and the second housing is hollow and defines openings at both ends thereof. The shaft sleeve is fixedly disposed in the second housing, and one end of the telescopic frame is movably disposed in the shaft sleeve.

In one embodiment, a recess groove is defined at the one end of telescopic frame, a sealing member is disposed on the recess groove and is configured to be in movable sealing contact with an inner wall of the shaft sleeve.

In one embodiment, first fixing protrusions are disposed on an outer side wall of the first housing, and second fixing protrusions are disposed on an outer side wall of the second housing. The second fixing protrusions are positioned corresponding to the first fixing protrusions. Fastening screws pass through the second fixing protrusions and are threadedly engaged with the first fixing protrusions.

In one embodiment, wiring posts and through holes respectively penetrate through a bottom cover of the first housing.

In one embodiment, the telescopic frame is made of the POM.

Compared with the prior art, beneficial effects of the telescopic motor of the present disclosure are as follows.

According to the telescopic motor of the present disclosure, the stator assembly drives the rotor mechanism to rotate, and the at least one guide member is configured to guide and limit the telescopic frame, such that the rotor mechanism drives the telescopic frame to perform linear motion along the at least one guide member. By changing a direction of current, the telescopic motor achieves telescopic linear motion. The core structure is assembled from the core bodies, facilitating external winding of the coil and thereby improving production efficiency to a certain extent. The stator assembly is configured to support the at least one guide member, enhancing stability of the telescopic motor and effectively addressing the problems of the complex structures and the low production efficiency of the conventional telescopic motors. Furthermore, since the shaft sleeve, the telescopic frame, and the at least one guide member are all made of the POM, wear resistance, stability, and fatigue resistance of the telescopic motor are improved.

BRIEF DESCRIPTION OF DRAWINGS

In order to illustrate technical solutions of embodiments of the present disclosure more clearly, following briefly describes accompanying drawings required for describing the embodiments. It should be understood that the accompanying drawings only show some embodiments of the present disclosure, and therefore should not be regarded as limiting a scope. For those who skilled in the art, other related drawings may be obtained according to these drawings without creative efforts.

Figure 1:
FIG. 1 is a three-dimensional structural schematic diagram of a telescopic motor according to one embodiment of the present disclosure.
Figure 1:
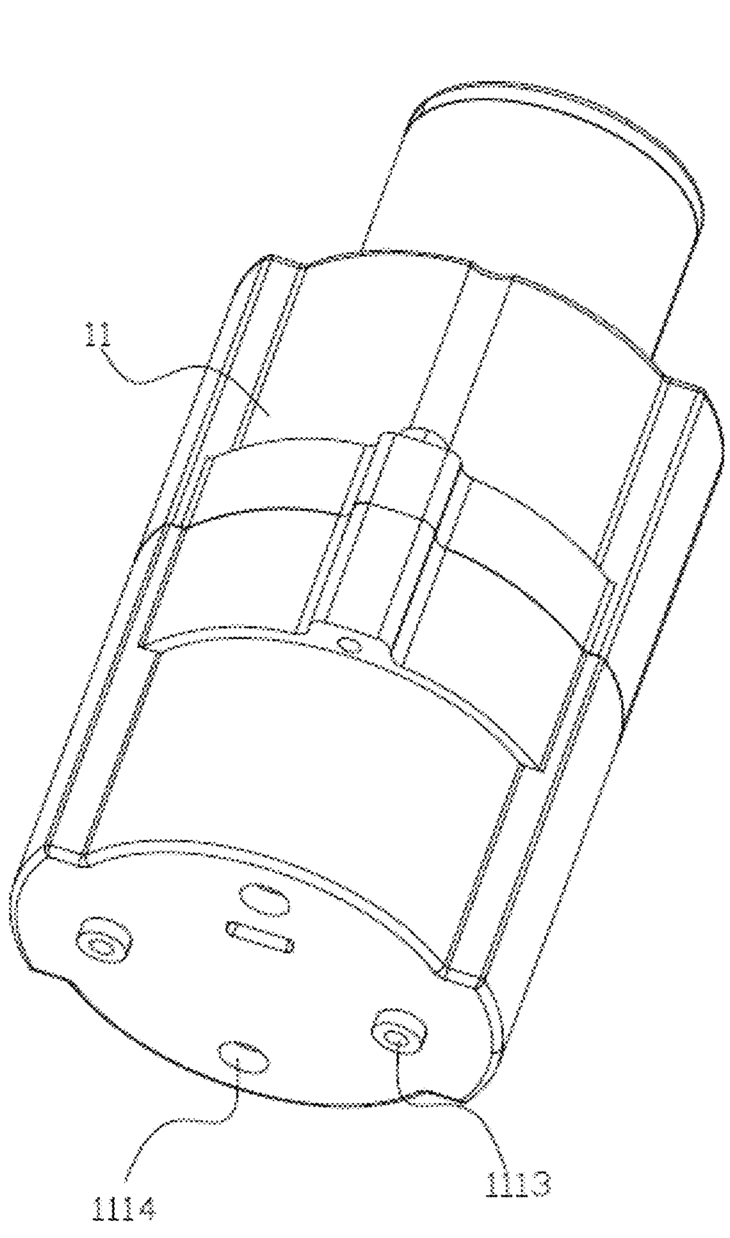

Reference numerals in the drawings: 10. telescopic motor; 11. housing assembly; 111. first housing; 1111. first fixing protrusion; 1112. first limiting groove; 1113. wiring post; 1114. through hole; 112. second housing; 1121. second fixing protrusion; 113. shaft sleeve; 114. fastening screw; 12. stator assembly; 121. core structure; 1211. first core body; 12111. limiting block; 12112. engagement groove; 12113. second limiting groove; 1212. second core body; 12121. engagement protrusion; 122. coil bobbin structure; 13. guide member; 131. oil filling hole; 14. telescopic rotor assembly; 141. rotor mechanism; 1411. magnetic steel; 1412. rotating shaft; 142. telescopic frame; 1421. connecting hole; 1422. guiding edge; 1423. recess groove; 143. sealing member.

DETAILED DESCRIPTION OF EMBODIMENTS

To make objectives, technical solutions, and advantages of embodiments of the present disclosure more apparent, the embodiments of the present disclosure are described in detail below with reference to accompanying drawings. It should be understood that the embodiments described are merely part of the embodiments of the present disclosure, rather than all possible embodiments. Components shown and described in the accompanying drawings may be arranged and designed in various different configurations.

Accordingly, following detailed description of the embodiments of the present disclosure provided in the accompanying drawings is not intended to limit a scope of the present disclosure as defined by claims, but merely illustrates selected embodiments of the present disclosure. Based on the embodiments of the present disclosure, all other embodiments that may be conceived by those who skilled in the art without inventive effort shall fall within a protection scope of the present disclosure.

Please refer to FIGS. 1-6, the present disclosure provides a telescopic motor 10, including a housing assembly 11, a stator assembly 12, at least one guide member 13, and a telescopic rotor assembly 14. The housing assembly 11 is hollow. The stator assembly 12 is fixedly disposed in the housing assembly 11. The at least one guide member 13 is fixed on stator assembly 12, such that the stator assembly 12 provides supporting engagement for the at least one guide member 13, thereby improving stability of the at least one guide member 13. The telescopic rotor assembly 14 is slidably disposed on the at least one guide member 13 and movably penetrates through the stator assembly 12 and the housing assembly 11 in sequence. The stator assembly 12 drives the telescopic rotor assembly 14 to linearly reciprocate under a guiding action of the at least one guide member 13.

Please refer to FIGS. 1-4, in the embodiments, the housing assembly 11 includes a first housing 111, a second housing 112, and a shaft sleeve 113. The first housing 111 is hollow and defines an opening at one end thereof, and the stator assembly 12 is limitably fixed in the first housing 111. The second housing 112 is hollow and defines openings at both ends thereof, and the second housing 112 is fixedly disposed in the first housing 111, thereby enclosing the stator assembly 12, the at least one guide member 13, and the telescopic rotor assembly 14. The shaft sleeve 113 is fixedly disposed in the second housing 112 at one end thereof that is away from the first housing 111, and one end of the telescopic rotor assembly 14 is movably and sealingly disposed in the shaft sleeve 113.

Figure 4:
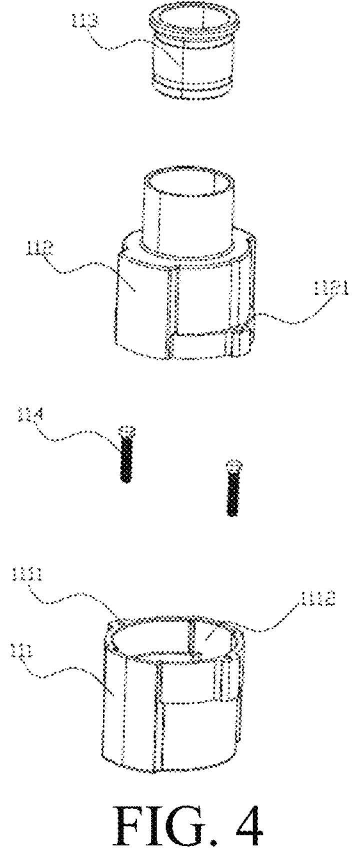
FIG. 4 is an exploded schematic diagram of the housing assembly shown in FIG. 3.

Please refer to FIG. 4, specifically, first fixing protrusions 1111 are disposed on an outer side wall of the first housing 111, and the second housing 112 is fixedly connected to the first housing 111 via the first fixing protrusions 1111. At least one first limiting groove 1112 is defined on an inner wall of the housing assembly 11, and the stator assembly 12 is fixedly disposed in the first housing 111 through the at least one first limiting groove 1112. Wiring posts 1113 and through holes 1114 respectively penetrate through a bottom cover of the first housing 111. Electrical wires are electrically connected to the stator assembly 12 via the wiring posts 1113, and heat generated in the housing assembly 11 is dissipated through the through holes 1114. Specifically, second fixing protrusions 1121 are disposed on an outer side wall of the second housing 112. The second fixing protrusions 1121 are positioned corresponding to the first fixing protrusions 1111. Fastening screws 114 pass through the second fixing protrusions 1121 and are threadedly engaged with the first fixing protrusions 1111, thereby fixedly connecting the second housing 112 to the first housing 111. Specifically, the shaft sleeve 113 is made of polyoxymethylene (POM), thereby providing the shaft sleeve 113 with wear resistance, and ensuring stability and fatigue resistance under oil-free lubrication conditions.

Figure 2:
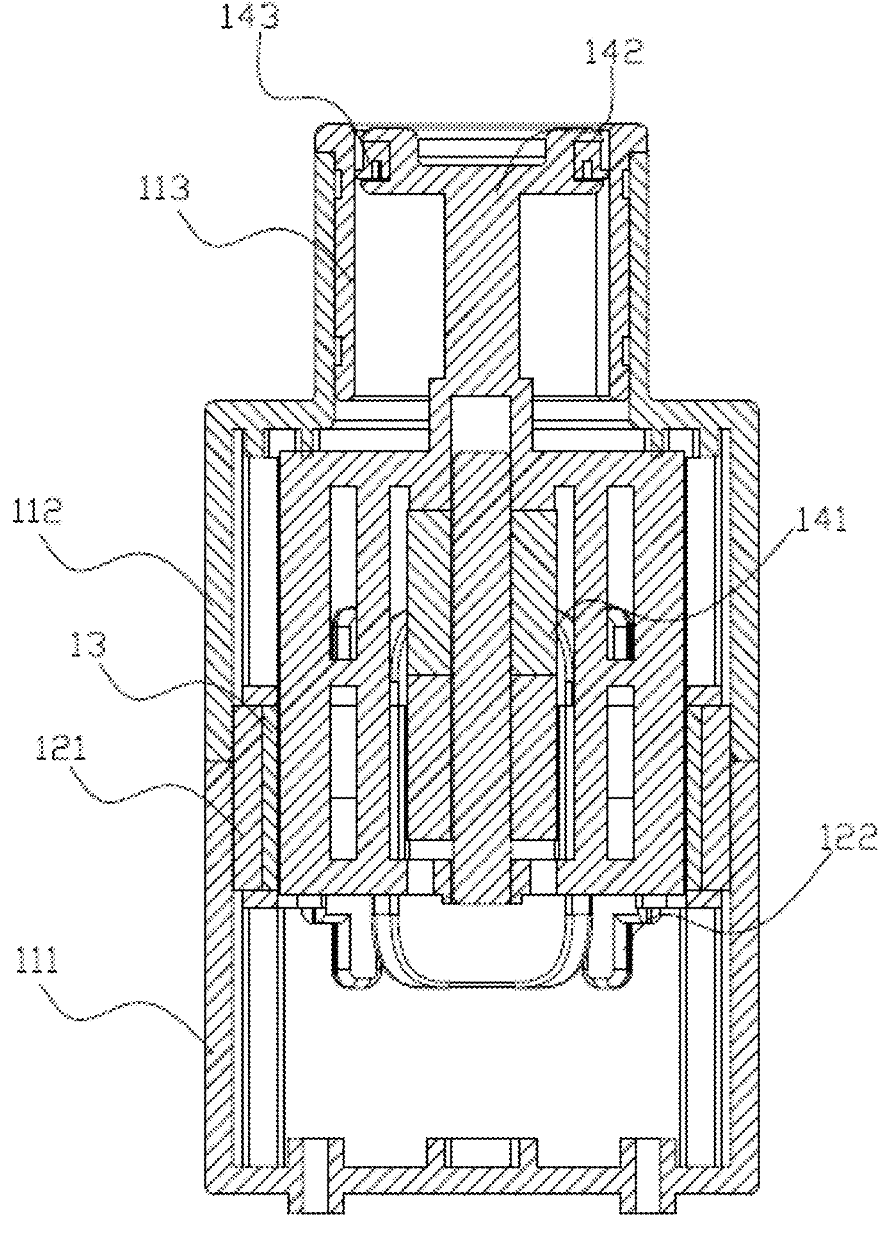
FIG. 2 is a cross-sectional structural schematic diagram of the telescopic motor according to one embodiment of the present disclosure.
Figure 3:
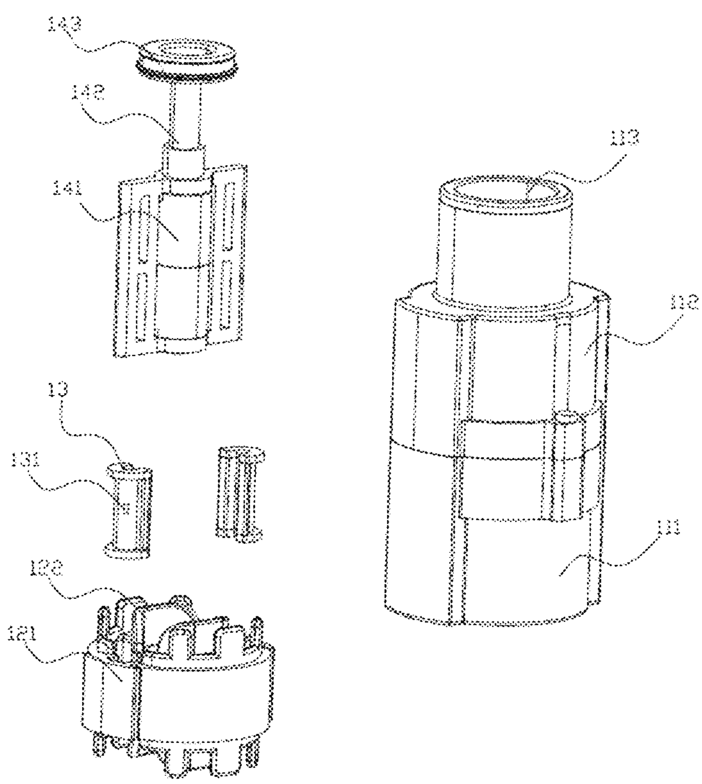
FIG. 3 is an exploded structural schematic diagram of the telescopic motor according to one embodiment of the present disclosure, including a housing assembly, a stator assembly, and a telescopic rotor assembly.
Figure 5:
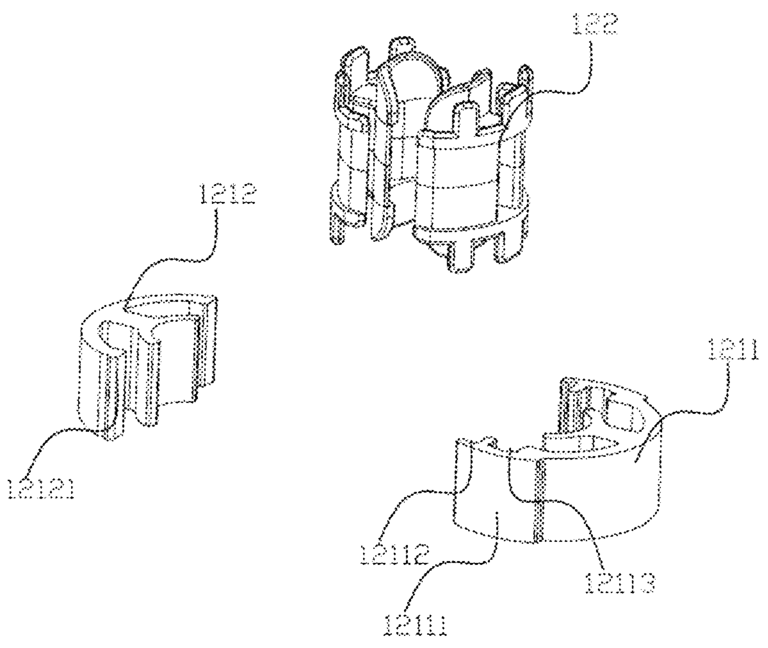
FIG. 5 is an exploded schematic diagram of the stator assembly shown in FIG. 3.

Please refer to FIGS. 2, 3, and 5, in the embodiments, the stator assembly 12 includes a core structure 121 and a coil bobbin structure 122. The core structure 121 is limitably fixed in the housing assembly 11 through the at least one first limiting groove 1112. The coil bobbin structure 122 passes through the core structure 121, and a coil is externally wound on the coil bobbin structure 122.

Please refer to FIG. 5, specifically, the core structure 121 includes core bodies, and the core bodies are circumferentially connected in sequence. In the embodiments, the core bodies include a first core body 1211 and a second core body 1212, the first core body 1211 is detachably engaged with the second core body 1212, and the first core body 1211 is limitably fixed in the first housing 111 through the at least one limiting groove 1112. Specifically, at least one limiting block 12111 is disposed on an outer side of the first core body 1211. The at least one first limiting block 12111 is limitably engaged with the at least one first limiting groove 1112. At least one engagement groove 12112 and at least one second limiting groove 12113 are defined on an inner side of the first core body 1211. The second core body 1212 is detachably engaged with the first core body 1211 through the at least one engagement groove 12112, so that the core structure 121 is hollow and annular. The at least one guide member 13 is limitably fixed to the core structure 121 through the at least one second limiting groove 12113. Specifically, at least one engagement protrusion 12121 is disposed on the second core body 1212. The at least one engagement protrusion 12121 is detachably engaged with the at least one engagement groove 12112, thereby fixedly connecting the first core body 1211 and the second core body 1212.

Please refer to FIGS. 2-3, in the embodiments, the at least one guide member 13 includes two guide members 13, and the at least one second limiting groove 12113 include two second limiting grooves 12113. The two guide members 13 are symmetrically limitably fixed to the core structure 121 through the two second limiting grooves 12113, and the two guide members 13 are configured to guide movement of the telescopic rotor assembly 14. In other embodiments, one, three, four, or any other number of guide members 13 are provided, and are set according to actual requirements. Specifically, the at least one guide member 13 is made of the POM, thereby providing the at least one guide member 13 with wear resistance, as well as stability and fatigue resistance under oil-free lubrication conditions. At least one oil filling hole 131 is defined on the at least one guide member 13 and penetrates through the at least one guide member 13, and lubricating oil is filled onto a guiding surface of the at least one guide member 13 via the at least one oil filling hole 131.

Figure 6:
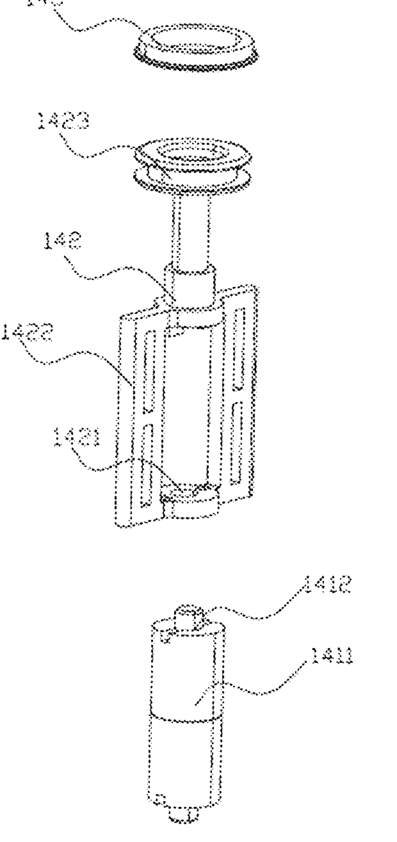
FIG. 6 is an exploded schematic diagram of the telescopic rotor assembly shown in FIG. 3.

Please refer to FIGS. 2, 3, and 6, in the embodiments, the telescopic rotor assembly 14 includes a rotor mechanism 141 and a telescopic frame 142. The rotor mechanism 141 movably passes through the stator assembly 12, and the stator assembly 12 drives the rotor mechanism 141 to rotate in both forward and reverse directions. The telescopic frame 142 is slidably disposed on the at least one guide member 13 and drivably connected to the rotor mechanism 141, in this way, through the guiding action of the at least one guide members 13, rotational movement of the telescopic frame 142 is converted into linear motion, thereby enabling the telescopic frame 142 to linearly reciprocate.

Please refer to FIG. 6, in the embodiments, the rotor mechanism 141 includes a magnetic steel 1411 and a rotating shaft 1412. The magnetic steel 1411 is a cylindrical magnet. The rotating shaft 1412 passes through the magnetic steel 1411 and is drivably connected to the telescopic frame 142. Specifically, the magnetic steel 1411 is made of a neodymium-iron-boron (NdFeB) magnet. In the embodiments, the telescopic frame 142 is made of the POM, thereby enhancing wear resistance of the telescopic frame 142 during movement on the at least one guide member 13 and the shaft sleeve 113, and providing stability and fatigue resistance under oil-free lubrication conditions.

Please refer to FIG. 6, specifically, the telescopic frame 142 defines two connecting holes 1421, the two connecting holes 1421 are opposite to each other, and two ends of the rotating shaft 1412 are respectively fixed in the two connecting holes 1421, thereby drivably connecting the rotating shaft 1412 and the telescopic frame 142. The at least one guide member 13 includes two guide members 13, two guiding edges 1422 are respectively disposed at two opposite sides of the telescopic frame 142, and the two guiding edges 1422 are respectively slidably disposed on the two guide members 13. In the embodiments, the two guiding edges 1422 are two guiding strips, each of the two guide members 13 includes a guiding groove, and each of the two guiding strips is slidably disposed in a corresponding guiding groove. In other embodiments, the two guiding edges 1422 are two guiding grooves, each of the guide members 13 includes a guiding strip, and each of the two guiding grooves is slidably disposed on a corresponding guiding strip. Specifically, a recess groove 1423 is defined at one end of the telescopic frame 142 close to the shaft sleeve 113, a sealing member 143 is disposed on the recess groove 1423 and is configured to be in movable sealing contact with an inner wall of the shaft sleeve 113.

A specific operating process of the telescopic motor 10 of the present disclosure is as follows.

When the coil on the stator assembly 12 is energized, the stator assembly 12 drives the rotor mechanism 141 to rotate. Due to a guiding and limiting action of the at least one guide member 13 on the telescopic frame 142, the rotor mechanism 141 drives the telescopic frame 142 to linearly move along the at least one guide member 13. By changing the direction of the current, the telescopic motor 10 is thereby enabled to linearly reciprocate.

Technical features described in the above embodiments may be arbitrarily combined. For the sake of brevity, not all possible combinations of the technical features in the embodiments have been described. Nevertheless, as long as such combinations do not contradict one another, they should be considered within a scope disclosed in this specification.

The embodiments described above merely illustrate several implementations of the present disclosure, and their descriptions are relatively specific and detailed; however, they should not be construed as limiting the scope of the present disclosure. It should be noted that, for those who skilled in the art, various modifications and improvements may be made without departing from a concept of the present disclosure, and these fall within the protection scope of the present disclosure. Therefore, a patent of the present disclosure shall be defined by appended claims.

What is claimed is:

1. A telescopic motor, comprising:

a housing assembly;

a stator assembly;

at least one guide member; and a telescopic rotor assembly;

wherein the stator assembly comprises a core structure, the core structure is limitably fixed in the housing assembly, the core structure comprises core bodies and a coil bobbin structure, the core bodies are circumferentially connected in sequence, the coil bobbin structure passes through the core structure, and a coil is externally wound on the coil bobbin structure;

wherein the at least one guide member is fixed on the core structure;

wherein the telescopic rotor assembly is slidably disposed on the at least one guide member and movably penetrates through the stator assembly and the housing assembly in sequence;

wherein the stator assembly drives the telescopic rotor assembly to linearly reciprocate under a guiding action of the at least one guide member;

wherein the telescopic rotor assembly comprises a rotor mechanism and a telescopic frame;

wherein the rotor mechanism movably passes through the stator assembly, and the telescopic frame is slidably disposed on the at least one guide member and drivably connected to the rotor mechanism;

wherein the rotor mechanism comprises a magnetic steel and a rotating shaft;

wherein the magnetic steel is a cylindrical magnet; and the rotating shaft passes through the magnetic steel and is drivably connected to the telescopic frame;

wherein the telescopic frame defines two connecting holes, the two connecting holes are opposite to each other, and two ends of the rotating shaft are respectively fixed in the two connecting holes.

2. The telescopic motor according to claim 1, wherein the core bodies comprise a first core body and a second core body, the first core body is detachably engaged with the second core body, and the first core body is limitably fixed in the housing assembly.

3. The telescopic motor according to claim 2, wherein at least one first limiting groove is defined on an inner wall of the housing assembly;

at least one limiting block is disposed on an outer side of the first core body; and the at least one first limiting block is limitably engaged with the at least one first limiting groove.

4. The telescopic motor according to claim 2, wherein at least one engagement groove is defined on an inner side of the first core body;

at least one engagement protrusion is disposed on the second core body; and the at least one engagement protrusion is detachably engaged with the at least one engagement groove.

5. The telescopic motor according to claim 2, wherein at least one second limiting groove is defined on an inner side of the first core body; and the at least one guide member is limitably fixed to the core structure through the at least one second limiting groove.

6. The telescopic motor according to claim 5, wherein the at least one guide member comprises two guide members, and the at least one second limiting groove comprises two second limiting grooves; and the two guide members are symmetrically limitably fixed to the core structure through the two second limiting grooves.

7. The telescopic motor according to claim 5, wherein at least one oil filling hole is defined on the at least one guide member and penetrates through the at least one guide member, and lubricating oil is filled onto a guiding surface of the at least one guide member via the at least one oil filling hole.

8. The telescopic motor according to claim 1, wherein the magnetic steel is made of a neodymium-iron-boron (NdFeB) magnet.

9. The telescopic motor according to claim 1, wherein the at least one guide member comprises two guide members, two guiding edges are respectively disposed at two opposite sides of the telescopic frame, and the two guiding edges are respectively slidably disposed on the two guide members.

10. The telescopic motor according to claim 9, wherein the two guiding edges are two guiding strips, each of the two guide members comprises a guiding groove, and each of the two guiding strips is slidably disposed in a corresponding guiding groove.

11. The telescopic motor according to claim 9, wherein the two guiding edges are two guiding grooves, each of the two guide members comprises a guiding strip, and each of the two guiding grooves is slidably disposed on a corresponding guiding strip.

12. The telescopic motor according to claim 1, wherein the at least one guide member and the telescopic frame are made of polyoxymethylene (POM).

13. The telescopic motor according to claim 1, wherein the housing assembly comprises a first housing, a second housing, and a shaft sleeve;

the first housing is hollow and defines an opening at one end thereof, and the stator assembly is limitably fixed in the first housing;

the second housing is fixedly mounted to the first housing, and the second housing is hollow and defines openings at both ends thereof, and the shaft sleeve is fixedly disposed in the second housing, and one end of the telescopic frame is movably disposed in the shaft sleeve.

14. The telescopic motor according to claim 13, wherein a recess groove is defined at the one end of the telescopic frame, a sealing member is disposed on the recess groove and is configured to be in movable sealing contact with an inner wall of the shaft sleeve.

15. The telescopic motor according to claim 13, wherein first fixing protrusions are disposed on an outer side wall of the first housing, and second fixing protrusions are disposed on an outer side wall of the second housing;

the second fixing protrusions are positioned corresponding to the first fixing protrusions; and fastening screws pass through the second fixing protrusions and are threadedly engaged with the first fixing protrusions.

16. The telescopic motor according to claim 13, wherein wiring posts and through holes respectively penetrate through a bottom cover of the first housing.

17. The telescopic motor according to claim 13, wherein the telescopic frame is made of POM.

* * * * *